F. M. OSBORNE.
DEMOUNTABLE TIRE RIM.
APPLICATION FILED MAR. 27, 1913.
1,095,349.
Patented May 5, 1914.
2 SHEETS—SHEET 1.
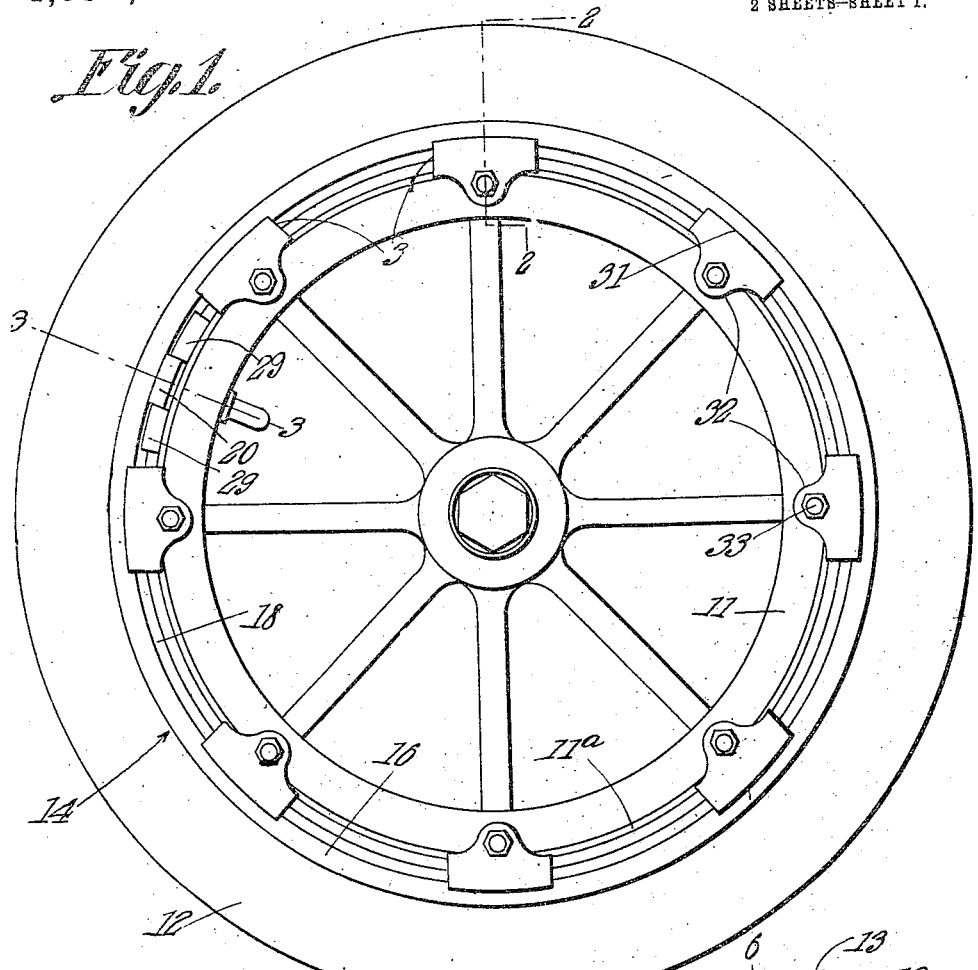
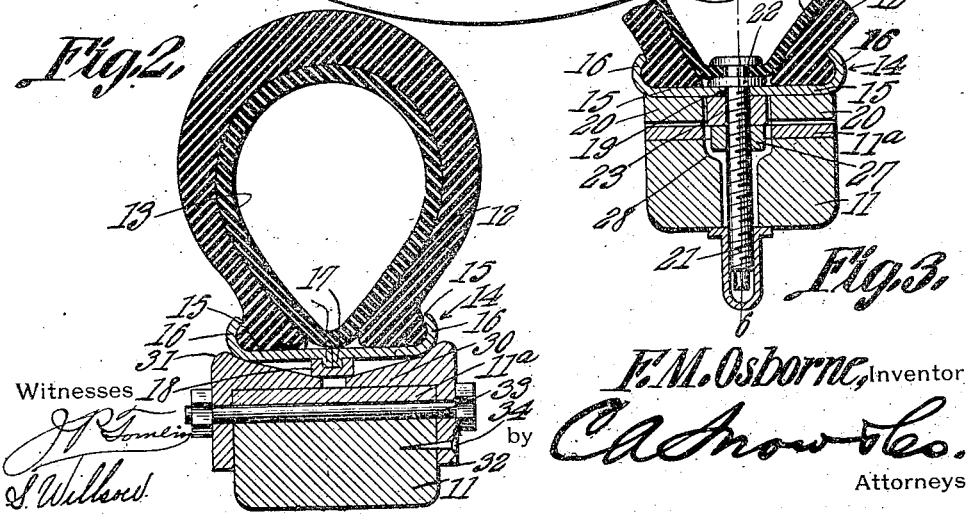
F. M. Osborne, Inventor
Attorneys

F. M. OSBORNE.
DEMOUNTABLE TIRE RIM.
APPLICATION FILED MAR. 27, 1913.

1,095,349.

Patented May 5, 1914.

2 SHEETS—SHEET 2.

Witnesses

F. M. Osborne, Inventor by

Attorneys

UNITED STATES PATENT OFFICE.

FRANK M. OSBORNE, OF ANACONDA, MONTANA.

DEMOUNTABLE TIRE-RIM.

1,095,349.  Specification of Letters Patent. Patented May 5, 1914.

Application filed March 27, 1913. Serial No. 757,242.

*To all whom it may concern:*

Be it known that I, FRANK M. OSBORNE, a citizen of the United States, residing at Anaconda, in the county of Deerlodge and State of Montana, have invented a new and useful Demountable Tire-Rim, of which the following is a specification.

The present invention appertains to demountable tire rims, and aims to provide a novel and improved device of that character possessing a high degree of utility.

It is the object of the present invention to provide a demountable tire rim embodying two duplicate or interchangeable sections and means for locking them together, so as to avoid right and left hand sections of different formation or construction, which not only increases the expense in manufacture, but also renders the assembling of the rim more difficult, as will be apparent.

Another object of the present invention is to provide a two-part rim, and a locking ring for the parts, in connection with means for expanding or spreading the locking ring into engagement with the parts of the rim.

A further object of the present invention is to provide a rim of the character indicated having means to accommodate the valve stem of the inner or inflatable tube of the tire.

A further object of the invention is to provide means coöperating with the valve stem for expanding or spreading the locking ring.

With the foregoing general objects outlined and with other objects in view, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 4:
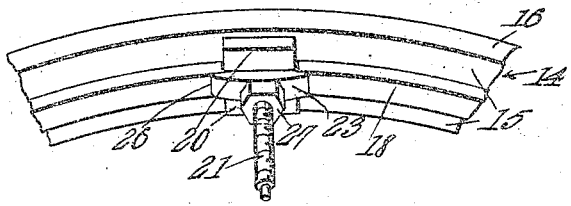
Figure 5:
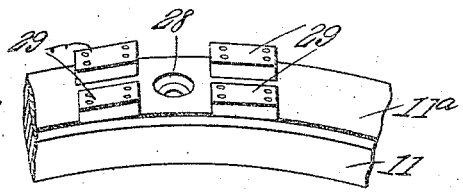
Figure 6:
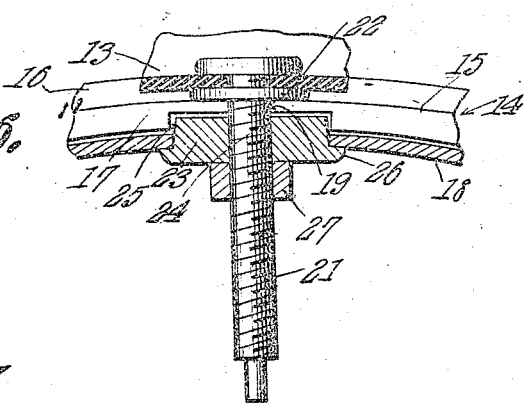
Figure 7:
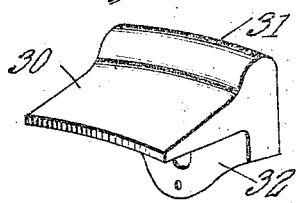
Figure 8:
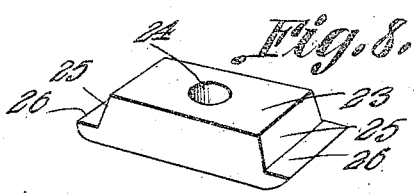
Figure 9:
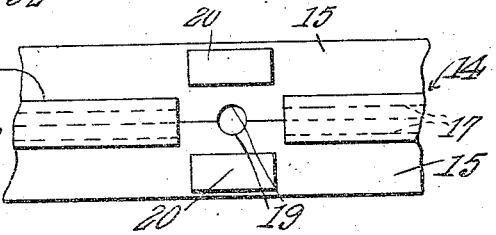

Figure 1 is a side elevation or face view of an automobile wheel provided with the improved tire rim. Fig. 2 is a sectional view taken on the line 2—2 of Fig. 1. Fig. 3 is a sectional detail taken on the line 3—3 of Fig. 1. Fig. 4 is a fragmental perspective of the rim showing the valve stem of the inner or inflatable tube. Fig. 5 is a fragmental perspective of the wheel felly. Fig. 6 is a sectional detail taken on the line 6—6 of Fig. 3. Fig. 7 is a perspective view of one of the wedges for securing the rim on the felly. Fig. 8 is a perspective view of the wedge block for expanding locking ring. Fig. 9 is a fragmental view of the rim looking toward the inner side.

Referring specifically to the drawings, the numeral 11 designates the felly of the wheel which is usually constructed of wood, and which has the metallic band 11$^a$ fitting tightly thereover.

The tire embodies the usual casing 12 having the inner or inflatable tube 13, and the present improved demountable rim has been designated generally by the numeral 14. The rim is adapted to engage the beads of the casing 12 and is adapted to be mounted on the felly, as will hereinafter appear. It may be stated, at this point, that the rim may be fashioned to accommodate either the "clencher" or "straight side" form of tire casing, both of which are prevalent or in common use, and the use of either being of no moment with respect to the present invention.

In carrying out the invention, the rim 14 is separated circumferentially into two parts or sections of equal width and proportions, the sections being designated by the numeral 15. The sections 15 are provided with the outturned bead-engaging flanges 16 at their outer or remote edges, and are provided with the inturned complementary flanges 17 at their inner or adjoining edges. As above indicated, the flanges 16 may be of any suitable formation or construction to accommodate either a clencher or straight side casing. The sections 15 are duplicates, or interchangeable, and may be readily pressed into shape in an easy and inexpensive manner, it being noted that only one set of dies, or one machine, is necessary for the formation of both of the sections or parts of the rim. Particular attention is directed to the fact that in the formation of the duplicate rim sections, their adjoining edges are bent inwardly to provide the flanges which are adapted to abut snugly against each other. The flanges 17 are adapted to abut against each other when the parts or the sections of the rim are assembled, and the said flanges are interrupted, broken or cut away at one point, as will be more clearly apparent by references in detail to Figs. 6 and 9. A channel-shaped locking ring 18 is engageable with the flanges 17, the locking ring 18 being split and its ends being spaced apart so as to terminate adjoining the ends of the flanges 17. Between the ends of the flanges 17 and ends of the locking ring 18, the sections 15 of the rim are provided with complementary or coöperating notches 19 in their inner or adjoining edges, providing an aperture or opening for the passage of the valve stem, as will hereinafter appear. At the sides of the notches 19 blocks 20 are welded, brazed or otherwise secured to the respective sections 15, the ends of the blocks 20 terminating adjoining the ends of the flanges 17 and locking ring 18.

The valve stem of the inner or inflatable tube 13 of the tire has been designated by the numeral 21, the same being of usual construction, and having a washer or nut 22 adapted to seat or bear against the outer sides of the sections 15 of the rim adjoining the notches 19 or between the blocks 20. As above indicated, the valve stem 21 passes inwardly through the notches 19, the notches 19 accommodating the valve stem 21 when the sections of the rim fit together.

As a means for expanding or spreading the locking ring 18, there is provided a wedge block 23 having an opening 24 therethrough loosely receiving the valve stem 21, the ends of the block 23 being beveled as at 25, so as to bear against the ends of the locking ring 18. The wedge block 23 is also provided with the lips 26 coöperating with the beveled ends 25 and adapted to overlap the ends of the locking ring. A nut 27 is threaded on the valve stem 21 and is adapted to bear against the wedge block 23 so as to force the wedge block between the ends of the locking ring, and in order to permit the wedge block to be withdrawn from between the ends of the locking ring when it is desired to liberate the locking ring.

The felly 11 is provided with the usual opening or passage 28 for the valve stem 21, and adjoining the opening 28, a plurality of blocks 29 are secured to the felly. Two pairs of blocks 29 are provided, the respective pairs being spaced apart, and the blocks of each pair also being spaced apart, so that the ends of the locking ring 18 may be received between the blocks of the respective pairs, and in order that the blocks 20 of the rim sections may be received between the respective blocks of the two pairs of blocks 29.

As a means for mounting or securing the rim on the wheel felly, there are provided a plurality of pairs of wedges 30. Each pair of wedges 30 rest against the felly, or band 11ª, and project toward each other with their butt ends remote from each other. The butt ends of the wedges are provided with the outstanding ribs 31, and are provided with the inturned ears 32 overlapping the sides of the felly. The tips of the wedges 30 are adapted to engage under the locking ring 18, and the ribs 31 are adapted to engage the outer or remote edges of the rim sections, bolts 33 being passed through the felly directly under the band 11ª, to connect the respective wedges of the several pairs together. The bolts 33 are passed through the ears 32, the inner ears 32 being preferably secured rigidly to the felly by means of screws or other securing members 34, and the nuts 35 of the bolts being disposed outermost so that the nuts may be readily removed for withdrawing the outer wedges 30.

When the relative parts are assembled, the flanges 17 of the rim sections will abut against each other, and the notches 19 will accommodate the valve stem 21, the valve stem passing through the opening 28 in the felly so as to project inwardly, as seen clearly in Fig. 1, the locking ring 18 engaging the flanges 17 to retain the sections of the rim together, the wedge block 23 spreading or expanding the locking ring to retain it firmly in engagement with the flanges 17. It is to be noted, that the ends of the locking ring will fit between the blocks 29 of the respective pair, thus assisting in preventing the lateral displacement of the rim, and the blocks 20 carried by the rim sections to fit between the respective blocks 29 of the two pairs, so as to constrain the rim against rotary movements on the felly, which might tend to shear or injure the valve stem 21. The wedges 30 in being secured in position by means of the bolts 32 will securely lock the rim on the felly.

When it is desired to detach the tire from the wheel, or rather the felly, the outer wedges 30 are withdrawn, which is permissible after the nuts 35 of the bolts 33 have been unscrewed and removed. After this has been done, the rim 14 may be readily withdrawn, and by unscrewing the nut 27, the wedge block 23 may be withdrawn from between the ends of the locking ring 18, and in which event, the locking ring 18 may be sprung out of engagement with the flanges 17. In this event, the rim sections are free to be spread with the beads or sides of the tire casing, so that the inner or inflatable tube may be withdrawn for purpose of repair or replacement. It will be apparent from the foregoing, that when the rim sections are spread apart with the beads or sides of the tire casing, the valve stem 21 will be liberated, as the notches 19 will be moved apart. Conversely, the inner or inflatable tube may be inserted into the casing through the rim sections which have been spread, and after the inflatable tube has been positioned within the casing, the rim sections may be brought together, with the valve stem 21 between the notches 19. After the rim sections have been brought together, the locking ring 18 may be sprung into engagement with the flanges 17, so that the ends of the locking ring and flanges may be properly positioned relative to each other, and in this event, the wedge block 23 is forced between the ends of the locking ring 18, by screwing or tightening the nut 27, so that the locking ring will be expanded to effect a tight engagement with the flanges 17, so as to lock the rim sections together. The rim may then be readily applied to the felly, the valve stem being first passed through the opening 28 in the felly, and the rim then being swung over the felly, as usual, to the proper position. The outer wedges 30 may then be positioned, and after engaging the nuts to the bolts 33, the wedges 30 may be forced toward each other so as to again secure the rim in position on the felly, as above indicated.

Particular attention is directed to the fact that the rim sections are interchangeable, the entire device being symmetrical at the sides of the median plane, so that the rim may be inserted in reversed positions on the felly, which is highly desirable. The present device is also comparatively simple, substantial, durable and inexpensive in construction, as well as efficient, serviceable and convenient in its use.

Having thus described the invention what is claimed as new is:—

1. In a demountable tire rim, two sections having complementary flanges along their adjoining edges, the flanges being interrupted at one point, and the adjoining edges of the sections being provided with complementary notches between the ends of the flanges, a split channel-shaped locking ring engageable with the said flanges with its ends disposed adjoining the ends of the flanges, and a wedge block engageable between the ends of the locking ring, and having an opening therein complementing the said notches.

2. A demountable tire rim embodying two sections having complementary inturned flanges along their adjoining edges, the flanges being interrupted at one point and the rim sections being provided with complementary notches in their adjoining edges between the ends of the flanges, a split channel-shaped locking ring engageable with the flanges with its ends disposable adjoining the ends of the flanges, blocks secured to the respective rim sections at the sides of the notches, and a wedge block insertible between the ends of the locking ring and having an opening to coöperate with the notches.

In testimony that I claim the foregoing as my own, I have hereto affixed my signature in the presence of two witnesses.

FRANK M. OSBORNE.

Witnesses:
 JOHN HILLBERG,
 JOHN W. JAMES.